United States Patent
Henderson

[19]

[11] Patent Number: 6,039,135
[45] Date of Patent: Mar. 21, 2000

[54] MACHINE FOR TRANSPORT OF PASSENGERS AND CARGO

[76] Inventor: J. Kirston Henderson, 1799 Ridgmar Blvd., Fort Worth, Tex. 76116

[21] Appl. No.: 08/921,180

[22] Filed: Aug. 29, 1997

Related U.S. Application Data

[60] Provisional application No. 60/025,451, Sep. 5, 1996.

[51] Int. Cl.[7] .................................................. B60K 1/00
[52] U.S. Cl. ...................... 180/65.3; 180/65.3; 104/88.04
[58] Field of Search .......................... 105/72.2; 301/128; 410/2, 4, 9, 19, 7; 180/65.2

[56] References Cited

U.S. PATENT DOCUMENTS

| | | |
|---|---|---|
| 3,570,407 | 3/1971 | Burch . |
| 3,637,956 | 1/1972 | Blackman . |
| 4,129,203 | 12/1978 | Berman . |
| 4,449,600 | 5/1984 | Telfer ...................................... 180/132 |
| 4,476,947 | 10/1984 | Rynbrandt . |
| 4,776,282 | 10/1988 | Ishikura et al. .......................... 104/109 |
| 4,991,516 | 2/1991 | Rixen et al. ............................. 104/130 |
| 5,138,952 | 8/1992 | Low ........................................ 105/72.2 |
| 5,590,603 | 1/1997 | Lund ..................................... 104/88.04 |

*Primary Examiner*—Lanna Mai
*Assistant Examiner*—Kevin McKinley
*Attorney, Agent, or Firm*—Felsman Bradley Vaden Gunter & Dillon, LLP; James E. Bradley

[57] ABSTRACT

An electrically powered vehicle transportation system utilizes a guideway with parallel enclosed rails. Each enclosed rail has an electrical bus bar for supplying power to vehicles on the guideway. The guideway will accommodate dual-mode vehicles that are capable of usage on conventional streets as well as on the guideway. The guideway also accommodates conventional vehicles and ferries that operate only on the guideway. The enclosed rails have a downward facing slot on an inner wall. The vehicle axles are offset, with a portion extending through each slot. The dual-mode vehicle has a body with axles that are extensible. The axles move from a retracted position, with the wheels recessed within the wheel wells, to an extended position. In the extended position, the wheels locate within the enclosed rails. Conventional vehicles and freight are carried on ferries that move along the guideways.

32 Claims, 3 Drawing Sheets

MACHINE FOR TRANSPORT OF PASSENGERS AND CARGO

This application claims the benefit of provisional application Ser. No. 60/025,451, filed on Sep. 5, 1996, in the U.S. Patent & Trademark Office.

TECHNICAL FIELD

This invention relates in general to mass transportation devices and in particular to a mass transportation device capable of use on roadways and trackways.

BACKGROUND ART

Mass transportation systems have been developed and proposed for a variety of transportation vehicles. In one example, the system uses vehicles which are carried by a cable or track and which stop for passenger or cargo pick-up and drop-off automatically upon demand which is made known to the system by either human input of some type or computer program. Such systems have been used and proposed for use in high traffic density situations. These systems have been designed for relatively low-speed operations and for relatively short distance applications such as within airports and in downtown areas. Vehicles for such systems have been carried on tracks or guideways. Switching of vehicles from track to track or guideway to guideway has generally been accomplished by employing movable track or guideway elements. Vehicles designed for such use may be used only on the tracks or guideways for which they are designed. Use of the tracks or guideways is also restricted to system captive vehicles designed only for track or guideway use. Some limited-use vehicles have been designed for dual road and track use under manual control. Examples of such a vehicle are normal road use trucks equipped with separate wheels to allow them to be driven by railroad maintenance personnel along railroad tracks under manual control. Some normal road-use automobiles have been adapted with either mechanical steering arms designed to cause the car to follow a steering rail mounted along a special roadway, or electronic sensors designed to cause the car to follow magnets or electrified wires embedded in road pavement. Several disadvantages are inherent in these past systems:

1. Some of the systems are capable of providing service only between stations and are incapable of providing door-to-door service to passengers and cargo.

2. Systems designed to allow specially equipped automobiles to operate on automated guideways have not provided on-demand or scheduled station-to-station service for non-automobile passengers.

3. Inability to provide door-to-door service for passengers and cargo greatly restricts the usefulness of station-to-station systems that use track or guideway only vehicles. Provision of such systems makes it necessary to employ other means such as conventional automobiles or trucks either instead of or in addition to the system. Such automobiles and trucks cause pollution of the atmosphere and require expensive and usually parallel networks of roads and highways.

4. In order to enable operation under the full range of weather conditions, track or guideway based systems must either be located in expensive tunnels or completely covered.

5. Trackways or guideways for past systems have been expensive to build because of needs to provide extensive land grading or massive structural supports for heavy elevated trackways or guideways.

6. Because past automated track or guideway based systems have been designed for relatively short range or low speed operations, they have not been practical for high-speed, long-distance operation. Thus, it is necessary to transfer passengers and cargo between vehicles for transportation over other than relatively short distances.

7. Because of items (1) and (6) above, past rail or guideway based systems using captive vehicles have not provided capability for long-distance, door-to-door service for passengers or cargo.

8. Individual passenger security and privacy are not provided during travel in systems in which relatively large vehicles are used.

9. Automatic point-to-point transportation of cargo is not provided via the same systems providing passenger travel.

10. Systems capable of providing station-to-station passenger service have been unable to accommodate dual mode road use and trackway or guideway use vehicles.

Another system uses special railroad cars equipped with wheel ramps arranged to allow automobiles to be driven onto and off of the railroad car for transport. Such cars and ramps are designed to carry several automobiles over conventional railroads. Ramps are also used at loading and unloading points to allow the cars to be driven onto an off of the rail cars. This system has several disadvantages:

1. The railroad cars are designed to carry a multiplicity of empty automobiles rather than one automobile with passengers.

2. The special railroad cars are designed to operate on conventional railroads rather than on an automated guideway.

3. The ramps for entry and exit of automobiles to the railroad cars are not designed to allow empty railroad cars designed to transport automobiles to pass freely under the entry and exit ramps to reach and leave the automobile loading position.

4. The railroad cars are designed to be pulled by conventional railroad engines as parts of conventional railroad trains rather than operating alone under automated control under their own power and control on an automated guideway system.

Still another system proposed makes use of dual mode cars for both conventional road and guideway use. This dual mode car is conveyed by a monorail and has a set of separate street wheels for street use. This car has a wide, lengthwise section down the center of the car to accommodate the monorail and can only fit passengers on either side of the car. The monorail drive wheels are complex.

What is needed is a single system for rapid and efficient transportation of passengers and cargo both on a door-to-door and station-to-station basis for either short range or long-distance.

DISCLOSURE OF INVENTION

This invention relates to a set of machines for automated transportation of passengers and cargo along special guideways, and for nonautomated transportation of passengers and cargo on conventional streets and roads with provisions for use of the same vehicles for both guideway and road applications and without transfer of passengers or cargo between vehicles when transferring between roads and guideways. The guideway has a pair of rails enclosed by a shroud. A slot extends through an inner side wall of each of the shrouds. The vehicle wheels are carried within the shroud on wheel contacting surfaces, with ends of the axles extending through the slots. An electrical bus bar is located within the shroud for providing power to the vehicle.

Some of the vehicles of this invention have axles which are extensible from a retracted position to an extended position. In the extended position, the wheels located within the enclosed rails. In the retracted position, the wheels recess within wheel wells of the vehicle for conventional street use. Other vehicles of this invention are dedicated for use only on the guideway.

Both types of vehicles are automatically controlled during guideway use. Vehicles and guideways are designed to provide protection from weather elements including snow, sleet, ice, and rain accumulation that would interfere with operation of the vehicles on the guideways. The design of the vehicles and guideways are such that switching of vehicles between guideways and on and off of the guideways is accomplished without discontinuities or moving parts in either the guideways or the guideway switching mechanisms.

The invention also comprises automated car ferry vehicles which are designed to hold and carry a single conventional automobile with passengers on the tracked automated transportation system. The system also has special ramps for loading and unloading the automobiles onto the ferries from conventional streets and roads.

BEST MODE FOR CARRYING OUT THE INVENTION

Figure 1:
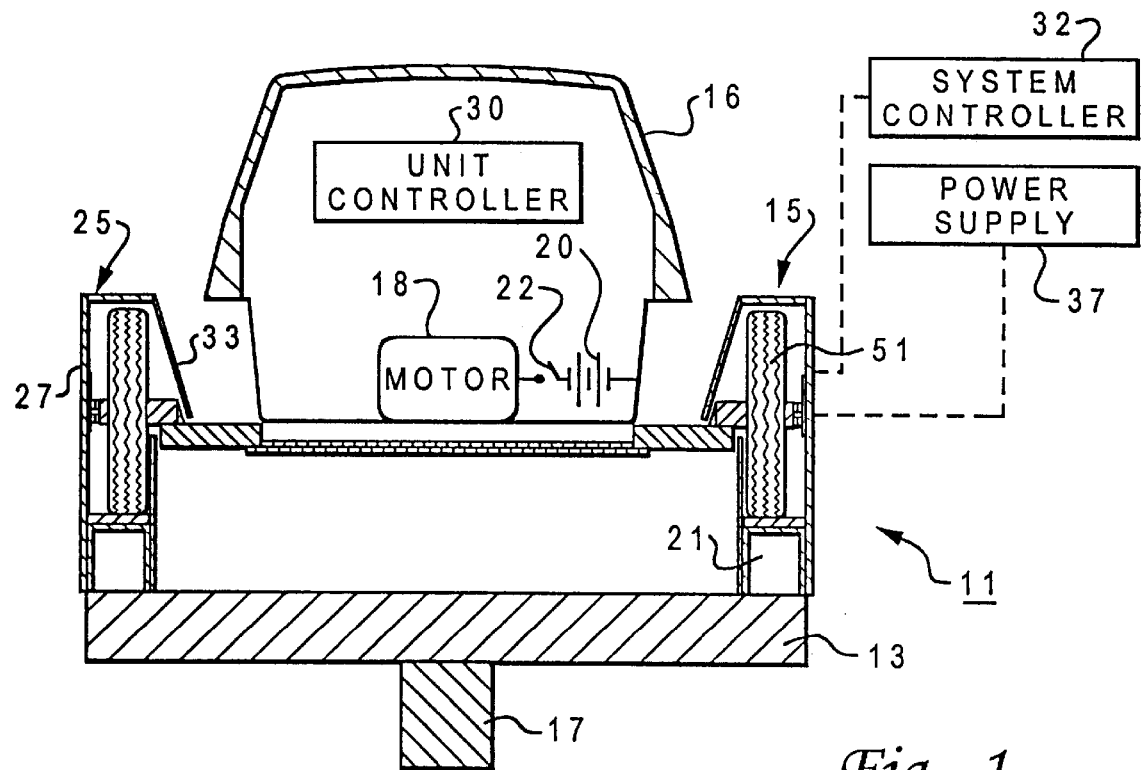
FIG. 1 is a front sectional view of a vehicle and guideway utilized in a mass transportation system that is constructed in accordance with the invention.

Referring to FIG. 1, a guideway 11 having two enclosed rails 15 for an electric vehicle 16 is shown. Vehicle 16 is electrically powered, having an electrical motor 18 which is powered by a set of batteries 20 while vehicle 16 is driven on conventional roads. A switch 22 between batteries 20 and motor 18 selectively supplies power to motor 18 or disengages batteries 20 from motor 18.

Figure 2:
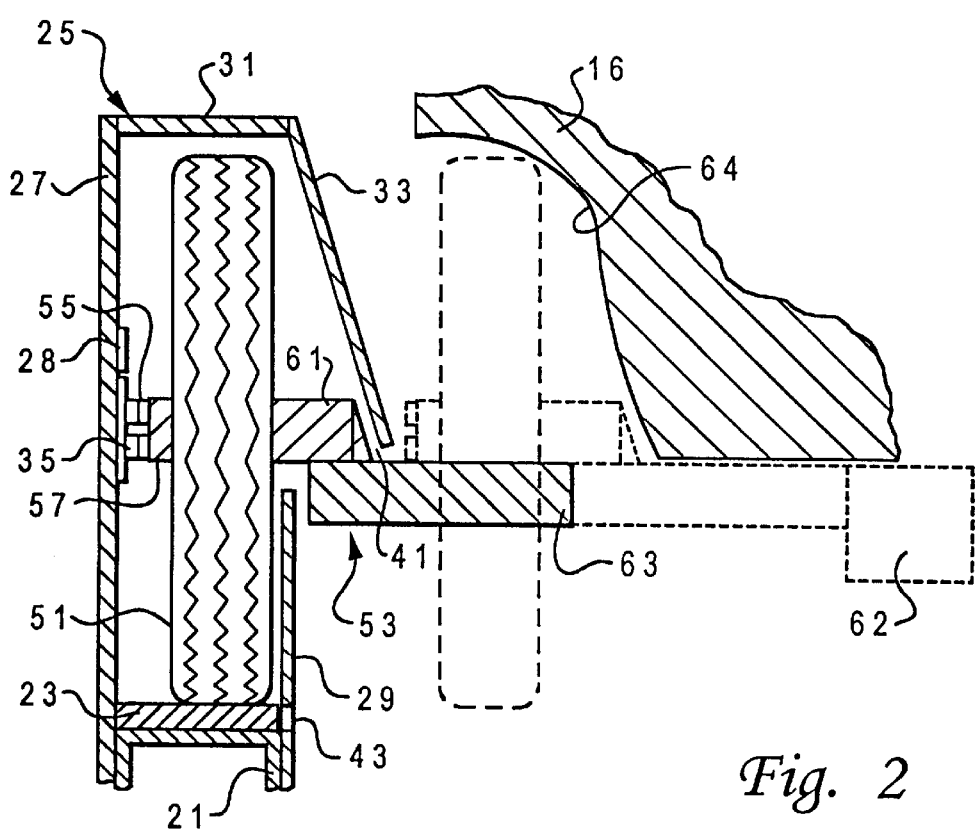
FIG. 2 is an enlarged front sectional view of one side of the guideway of FIG. 1.

In the embodiment shown, enclosed rails 15 are supported by a plurality of support structure beams 13 (only one shown) which are elevated above the ground on support columns 17. Each enclosed rail 15 extends along an outer end of support beam 13 and has an internal support channel 21 which is secured to an upper side of support structure beam 13. As shown in FIG. 2, a wheel contact surface or rail 23 is structurally supported from a lower side by each channel 21.

Enclosed rails 15 are enclosed by a shroud 25 which extends upward from support structure 13. Each shroud 25 has an external vertical side wall 27, a lower internal vertical side wall 29, a horizontal top 31 and an inclined upper side wall 33 extending downward from top 31. Top 31 joins an upper edge of external vertical side wall 27 and is parallel to rail 23. External vertical side wall 27 supports communication devices 28 mounted along an inner surface for communications between vehicle unit controllers 30 and a system controller 32 (FIG. 1). System controller 32 provides control signals to vehicle unit controller 30 on vehicle 16 by way of communication devices 28. A pair of electrical power bus bars 35 are also mounted along an inner surface of external side wall 27. Power bus bars 35 are supplied with power from a power supply 37 (FIG. 1). The term "bus bar" is used generically to include also other means of transmitting electrical power, such as inductive couplings. Wheel contact rail 23 and power bus bars 35 are removable elements to allow replacement in the event of wear.

Upper side wall 33 is at an angle relative to lower side wall 29 and extends farther inward. A downward facing, longitudinally extending slot 41 is defined between the upper edge of lower inner side wall 29 and upper inner side wall 33. External side wall 27, top 31, and upper and lower inner side walls 33, 29 are arranged to shield the active guideway elements from weather elements such as rain, ice, sleet, and snow. In the event that small amounts of moisture enter the enclosed rails 15, drain holes 43 are located along the inner side of wheel contact rail 23 to allow such moisture to drain from the enclosure.

Vehicle 16 has four wheels 51 (only one shown), all of which will move between an extended position shown by the solid lines and a retracted position shown by the dotted lines in FIG. 2. While in the extended position, vehicle wheels 51 are located within shroud 25 and roll on rails 23. In the extended position, an axle assembly 53 for each pair of wheels 51 extends through slot 41. Each axle assembly 53 has power pickup and steering interface elements 55 located directly ahead or behind of wheel 51 and supported by an insulating member 57. Interface elements 55 contact the track power bus bars 35 located at the sides of the enclosed rails 15. Wheels 51 are equipped with rubber tires which roll on rail 23. Rather than a single motor 18, an electric drive motor assembly (not shown) may optionally be located at the hub of each wheel 51 to provide vehicle propulsion. Axle assembly 53 includes parallel and offset axles 61, 63 running from the underside of vehicle 16. An actuator 62 selectively moves axles 61, 63 between the retracted and extended positions. Actuator 62 may be of various types for causing telescoping movement, such as rack and pinion or hydraulic. Rollers (not shown) are mounted at the exits and entrances of guideway 11 to reduce friction between the wheels 51 and support surfaces, allowing lateral outward and inward movement.

Electrical power is supplied by elements 35 to operate vehicle 16 during enclosed rail operation and to charge dual-mode vehicle batteries 20 to provide power to operate such vehicles when not on guideway 11. Offset axle 63 connects the vehicle wheel 51 inside the enclosed rail 15 to the rest of vehicle 16. The offset raises axle 63 over the inner lower vertical member 29. The vehicle steering mechanism is preloaded to cause the vehicle wheels 51 to steer so as to hold electrical power contact and steering elements 55 in contact with bus bars 35 at the side of the enclosed rail 15, thereby assuring power transfer and causing the vehicle to steer to follow bus bars 35. Vehicle control signal interface 28 located on vertical member 27 directly above bus bars 35, communicates control information between unit controller 30 and system controller 32. Such communications allow speed, position, and switching control of vehicles 16 as well as position tracking of all vehicles using the guideway 11. Vehicle steering and power interfaces are made to follow either the left or right track enclosed rails 15.

The retracted position for each wheel/axle assembly 51, 53 allows vehicle 16 to operate on conventional roads using the same wheels 51, axles 53, brakes (not shown) and motor 18 as are used during guideway 11 operation. While in the retracted position switch 22 is closed, supplying power from batteries 20 to motor 18. When vehicle 16 returns to guideway 11, the wheel and axle assemblies 51, 53 are returned to the extended position to run inside enclosed rails 15. Reconfiguration of dual mode vehicle wheel and axle positions is accomplished by mechanical actuators 62 located inside the dual mode vehicles 16. The retracted wheel and axle assembly position enables the vehicle wheel track width to be narrowed to be within the vehicle body lines to place wheels 51 inside vehicle fender wells 64 for road use. The extended position places wheels 51 outside of the vehicle lines to enable wheels 51 to run inside the enclosed rails 15 of guideway 11. The vehicle outside body line is inward of the enclosed rails 15. FIG. 1 illustrates a dual mode passenger vehicle 16 on guideway 11 with left and right wheel assemblies 51 in their extended positions inside enclosed rails 15 of guideway 11. While on guideway 11, switch 22 will be open as batteries 20 will not be supplying power to motor 18. Motor 18 will receive its power from bus bars 35. Other types of vehicles, such as high passenger count vehicles or cargo vehicles may be similarly configured for use on guideways 11 or as dual mode vehicles for both use on guideways 11 and conventional roads.

Figure 3:
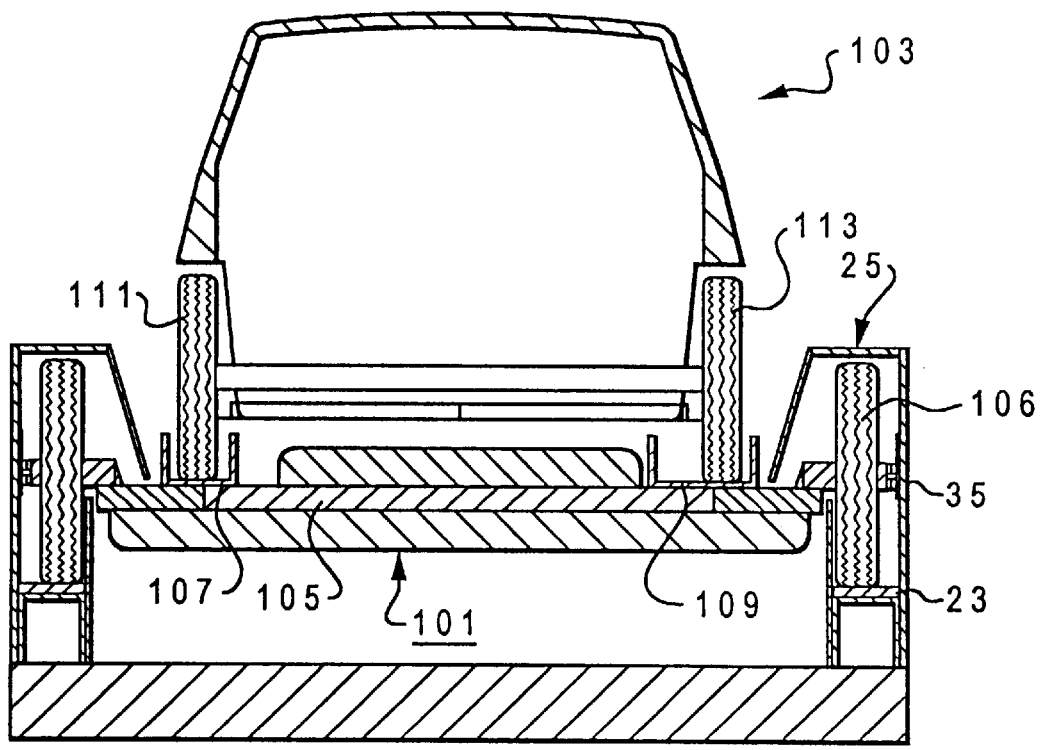
FIG. 3 is a front sectional view of an automobile ferry, an automobile and the guideway of FIG. 1.

Referring to FIG. 3, automobile ferry 101 is a vehicle for transporting conventional automobiles or cars 103 on guideway 11. Ferry 101 has a bed or platform 105 which is slightly wider and longer than car 103. Platform 105 is elevated above guideway support rail 23 by wheel assemblies 106 which are similar to wheel assemblies 51 in the extended position. Wheel assemblies 106 do not need to retract and extend as ferry 101 is dedicated for use on guideway 11. Ferry 101 has one or more electrical motors (not shown) for powering ferry 101. Power is supplied and control signals transmitted through bus bars 35 and interface 28 (FIG. 1).

Ferry 101 also has channel-shaped car wheel tracks 107, 109 on the top of platform 105 for securing car 103 while ferry 101 is moving. The left hand car wheel track 107 has a width which is designed to position the left automobile wheel 111 in a desired position to assure clearance from the inside of the enclosed rail 15. The car wheel track 109 at the right side has a greater width than track 107 to compensate for a range of different automobile wheel track widths.

Figure 4:
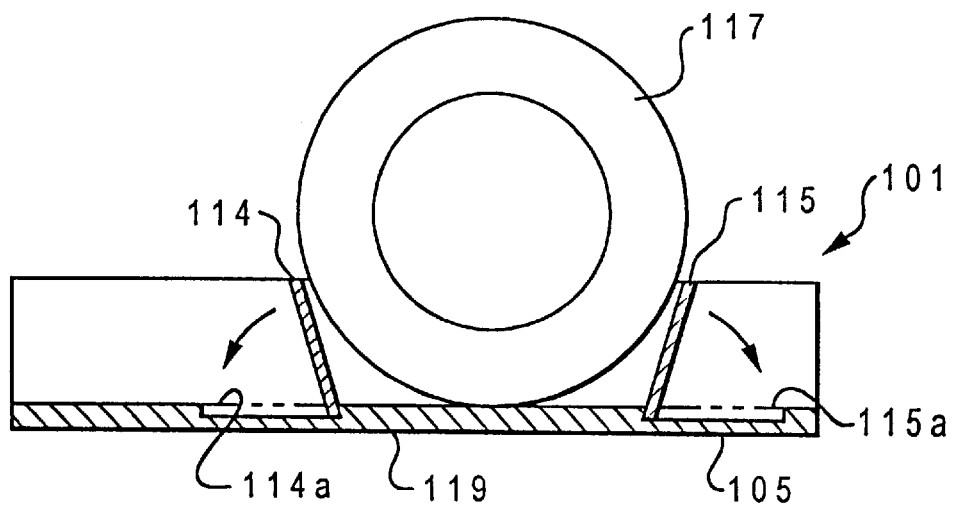
FIG. 4 is an enlarged side sectional view of a portion of the automobile ferry of FIG. 3.

As shown in FIG. 4, each wheel track 107, 109 has a pair of wheel stops 114, 115 which are shown in a raised position to constrain the longitudinal movement of car 103 while it is on ferry 101. One of the wheels 113 of car 103 engages wheel track bottom 119 and channel wheel stops 114, 115. The forward wheel stop 115 is shown in the raised position to stop the car in the correct position when driving onto wheel tracks 107, 109. The location of wheel stop 114 is indicated in the lowered position by the solid line 114a. In this position, car wheel 117 is able to roll over lowered wheel stop 114 until it reaches the raised forward wheel stop 115. When car wheel 117 reaches the raised forward wheel stop 115, wheel stop 114 is raised into the position indicated by the dotted line 114 to prevent car wheel 117 from backing up on the wheel track. Upon reaching the destination unloading point, wheel stop 115 is lowered to the position indicated by the dotted line 115a and wheel stop 114 is lowered to the position indicated by the solid line 114a to permit car 103 to drive forward along the track to leave the car ferry.

Figure 5:
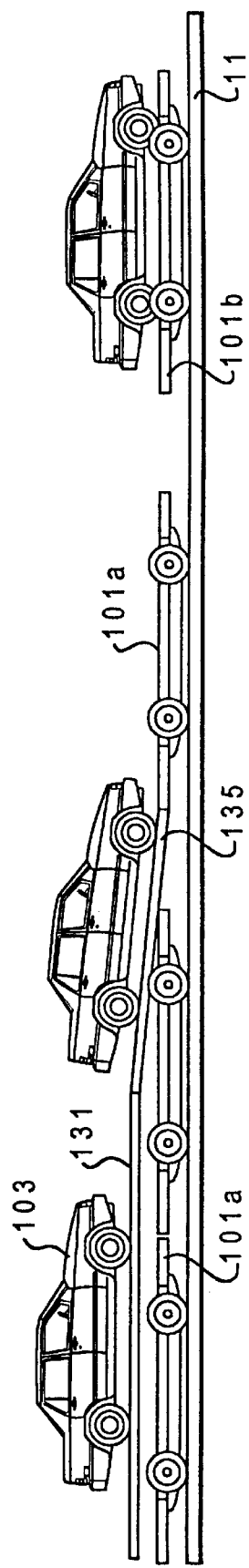
FIG. 5 is a schematic drawing of a loading station for the automobile ferry of FIG. 3.

Referring to FIG. 5, conventional cars 103 drive onto an elevated ramp 131 that is located directly above empty car ferries 101a running along a loading station above guideway 11. Empty car ferries 101a stop in a position so that cars 103 can drive down an inclined ramp section 135 onto the car ferry wheel channels. Upon loading, loaded car ferries 101b move away along guideway 11 to the destination selected by the automobile driver under automatic control.

Figure 6:
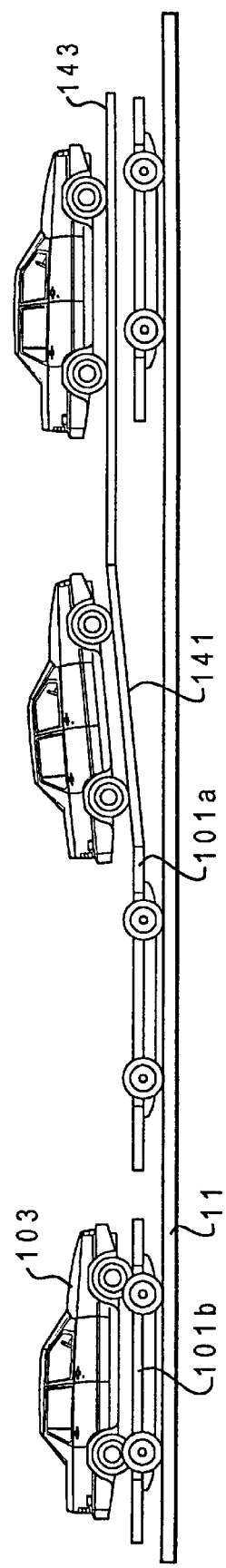
FIG. 6 is a schematic drawing of an unloading station for the automobile ferry of FIG. 3.

FIG. 6 shows the general arrangement of elements for unloading of automobiles 103 from loaded ferries 101b at the automobile destination. Loaded car ferries 101b approach the unloading point. Car ferries 101b stop at the correct position to allow cars 103 to be driven from the car ferry onto an inclined ramp 141 after the loaded ferry 101b stops. Cars 103 then drive away on an elevated ramp 143 to conventional streets or roads. Unloaded car ferries 101a move away either toward a car loading ramp or toward main line enclosed rails to another station under automatic control.

In its operational form, the ferry system provides a means to load, transport, and unload single conventional automobiles with driver and passengers inside by way of automated car ferries operating on weather-proof enclosed rails. Loaded ferries move non-stop from point of loading to destination as selected by the automobile driver.

The invention has significant advantages. The shrouds for the enclosed rails reduce operational problems due to rain, snow, ice and sleet. All active elements of the guideway and active elements of the vehicles are fully protected from weather elements, while providing a guideway suitable for dual mode vehicles as well as dedicated vehicles. The extensible wheel assemblies allow an electric vehicle to be driven both on its own power as a conventional road width vehicle on a conventional road and to operate under automatic control on guideway supplied power on the guideway of this invention using the same set of wheels, axles and motors. The ferry system invention has several advantages. This system allows transportation of conventional automobiles and their contained passengers under automatic control to desired destinations selected by the automobile driver. The ferry vehicle operates under automated control to move the ferry and its load from the loading point to the selected exit point. The ferry vehicle operates from electrical power supplied by power bus bars in the enclosed rail. Automobiles may be loaded and unloaded easily and quickly.

Although only the preferred embodiments of devices for carrying out the invention have been disclosed above, it not to be construed that the invention is limited to such embodiments. Other modifications may be made by those skilled in the art without departing from the spirit and scope of the invention.

I claim:

1. An electrically powered vehicle transportation system, comprising:

a guideway with parallel enclosed rails which extend longitudinally, each of the enclosed rails having a shroud for reducing entry of moisture into an interior portion of the enclosed rails due to weather, the shroud having an upright outer side wall, an upright inner side wall with a wheel engaging surface therebetween, and a top extending between the side walls over the wheel engaging surface;

a downward facing slot extending longitudinally through each of the inner side walls;

an electrical bus bar extending along one of the side walls of at least one of the enclosed rails;

a plurality of electrically powered vehicles, each having a pair of axles with a pair of wheels mounted to each end of each of the axles, wherein each of the ends of each of the axles is offset from an axis of rotation of a central portion of each of the axles, extends through one of the slots, and the wheels are located within the shrouds in engagement with the wheel engaging surface; and an electrical contact on the vehicle which electrically engages the electrical bus bar for delivering power to the vehicle.

2. The transportation system of claim 1 wherein a first one of the vehicles has extensible axles wherein each of the ends of each of the axles is laterally extensible between a retracted position for conventional road use, and an extended position for engaging the enclosed rails.

3. The transportation system of claim 2 wherein a second one of the vehicles has fixed width axles.

4. The transportation system of claim 1 wherein at least one of the vehicles is a ferry having a bed into which a conventional automobile may be loaded; and wherein the bed is located at a lower elevation than the top of the shroud.

5. The transportation system of claim 4 further comprising restraining means mounted to the bed for engaging a wheel of the automobile for restraining the automobile from movement while it is parked on the ferry.

6. The transportation system of claim 5 wherein the restraining means comprises at least one wheel stop which has a recessed position allowing the automobile to freely move on the ferry and an upward protruding position which stops movement in forward and rearward directions.

7. The transportation system of claim 4, further comprising a ramp which aligns with the bed of the ferry to allow the automobile to be driven onto and off the bed of the ferry, the ramp extending over a portion of the guideway and providing adequate clearance to allow the ferry to move on the guideway under the ramp into an aligned position with the ramp.

8. The transportation system of claim 1 wherein at least one of the vehicles further comprises:

an electrical motor for driving the wheels;

a battery for supplying power to the electrical motor to enable the vehicle to be driven on conventional roads; and a switch between the battery and the motor for electrically disconnecting the battery from the motor while the vehicle is on the guideway so that the motor receives power from the electrical bus bar, and for electrically connecting the battery to the motor while the vehicle is on conventional roads.

9. The transportation system of claim 1 wherein each of the inner side walls has an upper portion which inclines downward and inward, a lower portion which is upright, defining the slot therebetween.

10. The transportation system of claim 1 further comprising:

a system controller for controlling movement of the vehicles;

a vehicle controller located in at least some of the vehicles for controlling the vehicle; and communication devices mounted along the guideway within the shroud, the communication devices being connected to the system controller for communicating with the vehicle controller to allow speed, position, and switching control of the vehicles.

11. The transportation system of claim 1 further comprising:

a steering interface element mounted on the vehicle for engaging the bus bar and steering the vehicle, wherein the electrical contact is located adjacent at least one of the wheels of the vehicle.

12. The transportation system of claim 1 wherein at least one of the vehicles is a ferry having a bed with a pair of tracks on which a conventional automobile may be driven, and wherein the bed and the track are permanently mounted to the ferry.

13. The transportation system of claim 1 further comprising:

an electrical bus bar extending along one of the side walls of the other of the enclosed rails;

an additional electrical contact on the vehicle on a side of the vehicle opposite said first mentioned electrical contact; and wherein said first mentioned electrical contact may be preloaded against first mentioned bus bar and said additional electric contact may be preloaded against said second mentioned bus bar at different segments along said guideway.

14. The transportation system of claim 2 wherein each end of each axle is centered on a hub of each wheel and each axle has a central portion recessed below each end.

15. The transportation system of claim 2 wherein the electrical contact is located adjacent to at least one of the wheels of the vehicle.

16. The transportation system of claim 15 wherein in the retracted position, the wheels and the electrical contact are received within a body portion of the vehicle and in the extended position the wheels and the electrical contact protrude laterally past the body portion.

17. The transportation system of claim 3 wherein the second one of the vehicles is adapted to carry passengers.

18. The transportation system of claim 4 wherein the second one of the vehicles is adapted to carry cargo.

19. The transportation system of claim 4 further comprising a pair of wheel tracks extending longitudinally on the bed of the ferry for receiving wheels of the automobile, one of the wheel tracks having a greater width than the other to accommodate vehicles having different track width dimensions.

20. The transportation system of claim 9 wherein the upper portion of each of the inner side walls has a lower edge and the lower portion of the inner side walls has an upper edge, the vertical distance between the upper and lower edges being less than a vertical dimension of the axle where it passes through the slot.

21. The transportation system of claim 1 wherein the vehicles have motors that power the vehicles on the guideway as well as on conventional roads, and the wheels and axles of the vehicles are used both on the guideway as well as on conventional roads.

22. An electrically powered transportation system, comprising:

a guideway with parallel enclosed rails which extend longitudinally, each of the enclosed rails having a shroud for reducing entry of moisture due to weather, the shroud having an upright outer side wall, an upright inner side wall, a wheel engaging surface therebetween, and a top extending over the wheel engaging surface;

a downward facing slot extending longitudinally through each of the inner side walls;

an electrical bus bar extending along one of the side walls of at least one of the enclosed rails;

an electrically powered ferry having a bed onto which an automobile may be loaded, a pair of axles with a wheel mounted to each end of each of the axles, wherein each end of each of the axles is offset from an axis of rotation of a central portion of each of the axles and extends through one of the slots with its wheel engaging the wheel engaging surface; and an electrical contact on the one of the ends of one of the axles which engages the electrical bus bar for delivering power to the ferry.

23. The transportation system of claim 20 wherein the vehicle has a body and wherein the rails are located laterally outside of the body to minimize lateral rolling of the vehicle.

24. The transportation system of claim 1 wherein the upper portion of each of the inner walls has a lower edge and lower portion of each of the inner walls has an upper edge, the vertical distance between the upper and lower edges being less than the vertical dimension of the axle where it passes through the slot.

25. The transportation system of claim 24 further comprising an electrically powered vehicle which has extensible axles wherein each of the ends of each of the axles is laterally extensible between a retracted position for conventional road use, and an extended position for engaging the enclosed rails, the vehicle having a contact which engages the bus bar for receiving power for operating on the guideway in conjunction with the ferry.

26. The transportation system of claim 24 further comprising at least one wheel stop which has a recessed position allowing the automobile to freely move on the ferry and an upward protruding position which stops movement in forward and rearward directions.

27. The transportation system of claim 24, further comprising a ramp for interfacing with the ferry to load the automobile onto the ferry and to offload the automobile from the ferry, the ramp extending over a portion of the guideway and providing adequate clearance to allow the ferry to move on the guideway under the ramp into an aligned position.

28. The transportation system of claim 24 wherein each of the inner side walls has an upper portion which inclines downward and inward, a lower portion which is upright, defining the slot therebetween.

29. The transportation system of claim 24 wherein the bed is located at a lower elevation than the top of the shroud.

30. The transportation system of claim 24 further comprising a pair of wheel tracks extending longitudinally on the bed of the ferry for receiving wheels of the automobile, one of the wheel tracks having a greater width than the other to accommodate vehicles having different track width dimension.

31. The transportation system of claim 24 further comprising:

a steering interface element mounted on the vehicle for engaging the bus bar and steering the vehicle, wherein the electrical contact is located adjacent at least one of the wheels of the vehicle.

32. The transportation system of claim 25 wherein the vehicle has a motor that powers the vehicle on the guideway as well as on conventional roads, and the wheels and axles of the vehicle are used both on the guideway as well as on conventional roads.

* * * * *